J. H. A. BOUSFIELD.
AUTOMATIC HOPPER SCALE.
APPLICATION FILED DEC. 19, 1911.
1,149,331.
Patented Aug. 10, 1915.
4 SHEETS—SHEET 1.
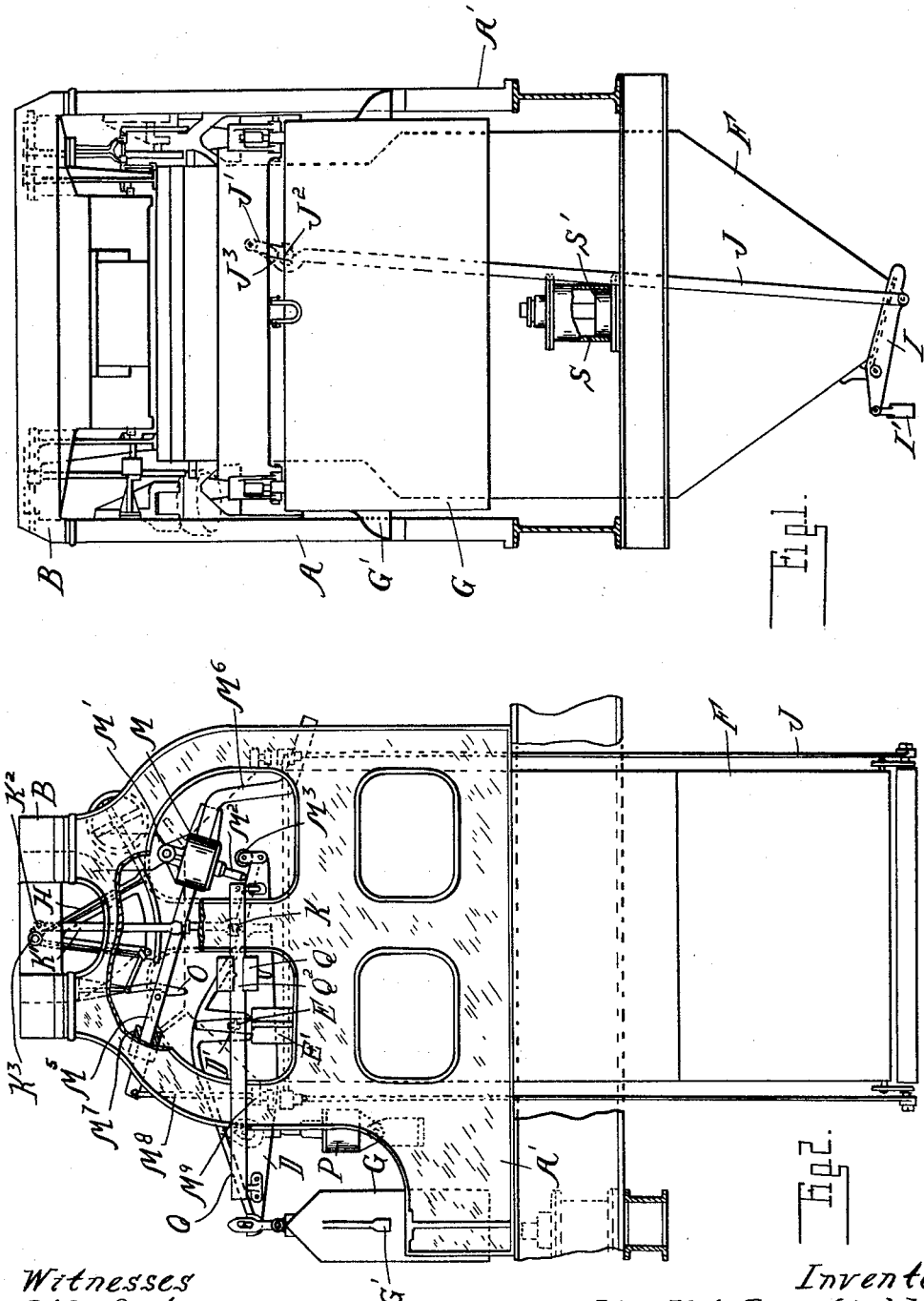
Witnesses
W. K. Ford
James P. Barry
Inventor
John H. A. Bousfield
By Whittemore Hulbert & Whittemore
Atty's

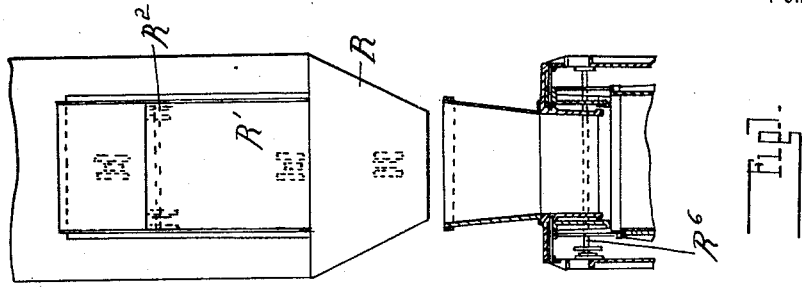
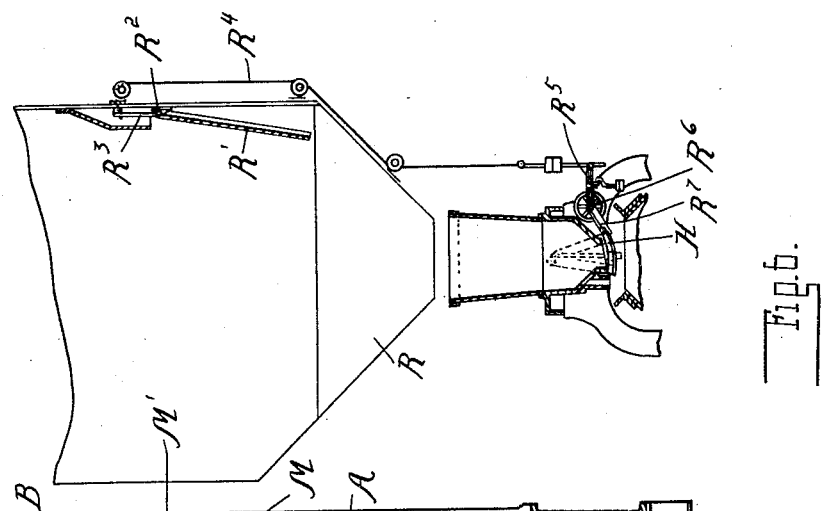
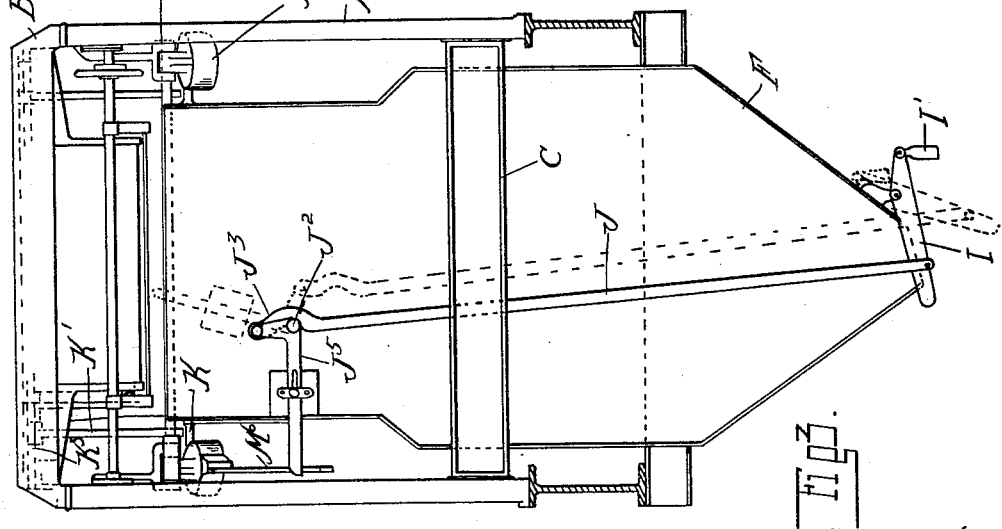

J. H. A. BOUSFIELD.
AUTOMATIC HOPPER SCALE.
APPLICATION FILED DEC. 19, 1911.
1,149,331.
Patented Aug. 10, 1915.
4 SHEETS—SHEET 3.
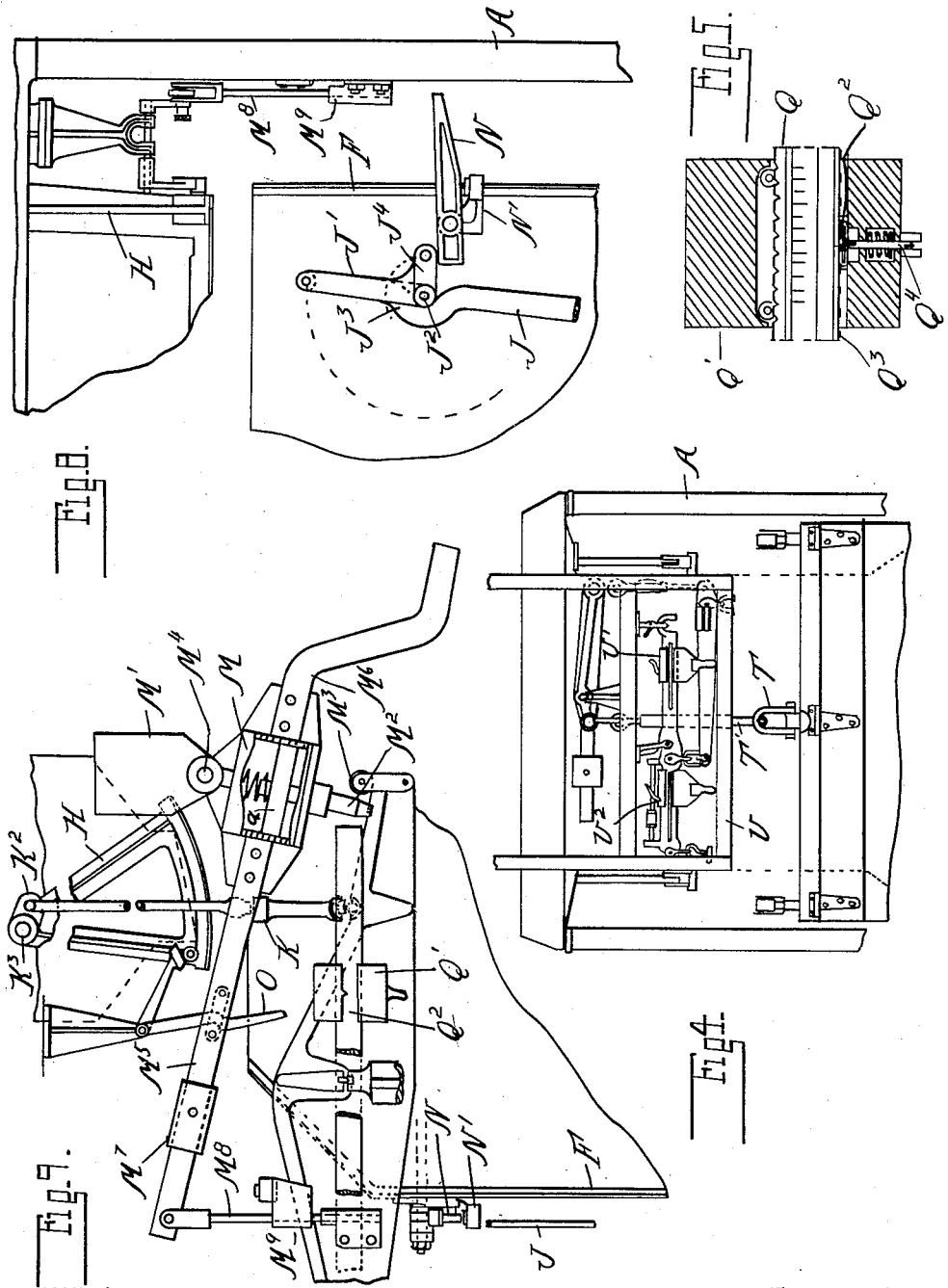
Witnesses
W. K. Ford
James P. Barry
Inventor
John. H. A. Bousfield.
By Whittemore Hulbert & Whittemore
Atty's

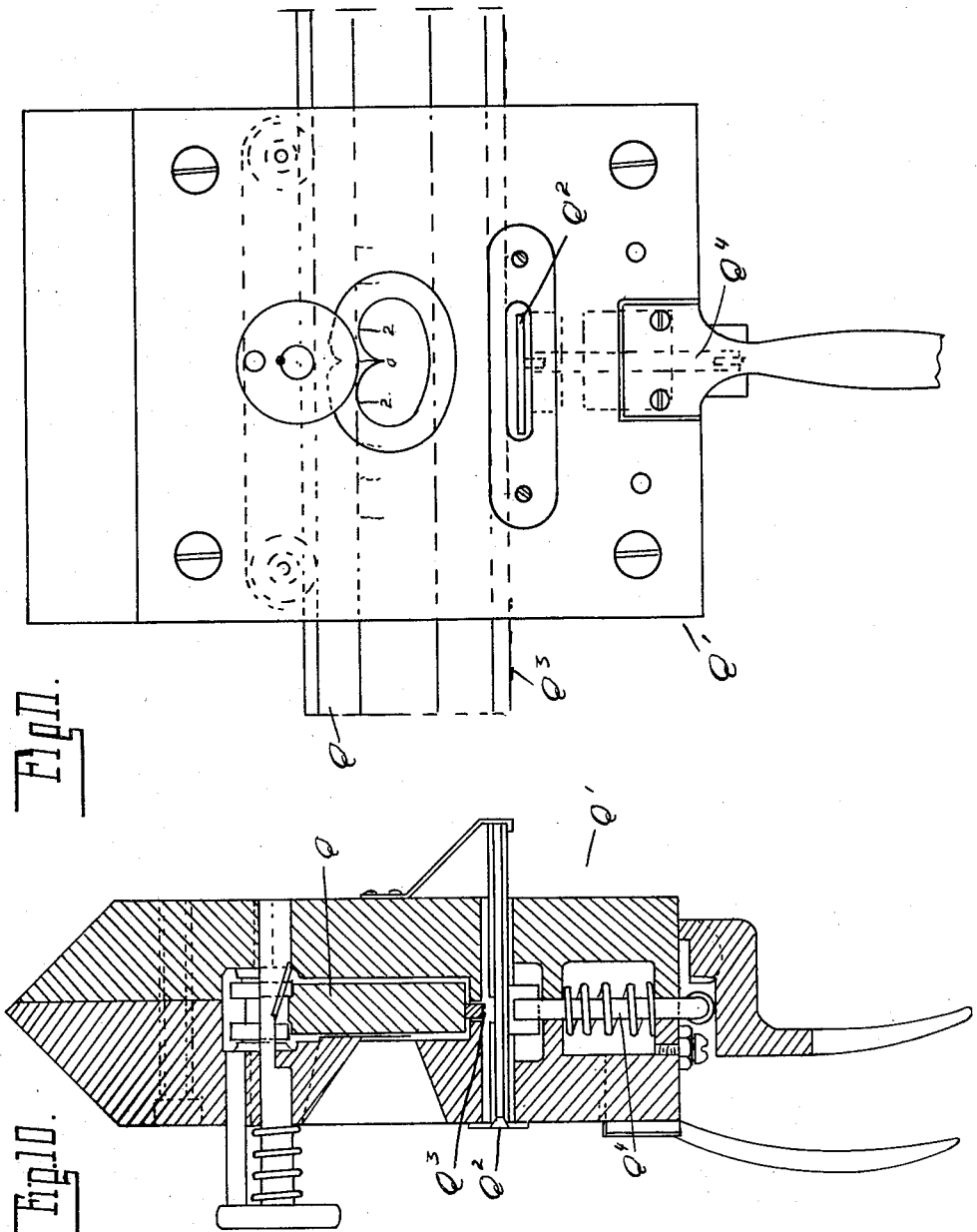

UNITED STATES PATENT OFFICE.

JOHN H. A. BOUSFIELD, OF ST. JOHNSBURY, VERMONT, ASSIGNOR TO E. & T. FAIRBANKS & COMPANY, OF ST. JOHNSBURY, VERMONT, A CORPORATION OF VERMONT.

AUTOMATIC HOPPER-SCALE.

1,149,331.   Specification of Letters Patent.   Patented Aug. 10, 1915.

Application filed December 19, 1911. Serial No. 666,768.

*To all whom it may concern:*

Be it known that I, JOHN H. A. BOUSFIELD, a citizen of the United States of America, residing at St. Johnsbury, in the county of Caledonia and State of Vermont, have invented certain new and useful Improvements in Automatic Hopper-Scales, of which the following is a specification, reference being had therein to the accompanying drawings.

The invention relates to grain weighing scales and of that type known as automatic in which the hopper alternately receives and discharges a predetermined weight of material, recording each operation and the total weight of material handled.

It is the particular object of the invention to adapt the scale for handling large masses of grain and at the same time to avoid the shock incident to the inertia of the moving mass.

To this end the invention consists in the shock absorbing means employed and the application of the same to the mechanism of the scale.

It is a further object to secure absolute accuracy in measurement which is accomplished by the alternative locking of the inlet and discharge gates so as to preclude the possibility of any opening in advance of the closing of the other.

Other features of the invention are the means employed for preventing the operation of the scale when there is less than one hopper full of grain in the garner, further the means for recording the setting of the underload or minus beam, and further in various details of construction as hereinafter set forth.

In the drawings, Figure 1 is a front elevation; Fig. 2 is a side elevation; Fig. 3 is a rear elevation; Fig. 4 is a front elevation of the residue weigher; Fig. 5 is a longitudinal section through the poise; Figs. 6 and 7 are respectively a vertical section and end elevation of the garner and gate controlling mechanism; Figs. 8 and 9 are end and side elevations showing the operation of the shock absorbers and brake weight lever; Figs. 10 and 11 are cross section and front elevation of the registering poise.

In general construction the scale comprises a frame composed of heavy end members A connected at their upper ends by a hopper-shaped casting B and also connected by suitable cross beams C whereby the requisite strength and rigidity is secured.

D is the main lever which is provided with knife edge bearings D' fulcrumed on bearing blocks E and mounted on brackets E' projecting inwardly from the end frame members A.

F is the hopper, the upper portion of which is of a width to clear the main lever, while the lower portion is enlarged in width beneath the lever and its fulcrum to secure greater capacity.

G is a weight box suspended from the free end of the lever D and extending between projecting portions A' of the end frames on which projections the box is supported in its position of rest through lugs G'.

H is the inlet gate which is of segmental form and is arranged at the lower end of the hopper member B, and I is the discharge gate at the lower end of the hopper F.

The gates H and I are automatically operated by mechanism controlled by the movement of the hopper F and also each is provided with positive locking means for holding it closed until after the closing of the other gate. The lower or discharge gate I is opened when released by the weight of grain operating thereon, and after discharge, is closed by a counter-weight arm I'.

J are links connected to the gate I at opposite ends and extending upward adjacent to the hopper, being attached at their upper ends to cranks J' on the cross shaft J² journaled in bearings on the hopper. The links J have off-set portions J³, which permit the crank J² when extending upward to pass slightly beyond the center, thereby locking the gate in closed position.

The inlet gate H is closed by gravity and is opened by the upward movement of the hopper through the medium of lugs K thereon impinging against rods K' attached to rock arms K² on the rock shaft K³ upon which the gate H is mounted.

With the parts as thus far described, it is evident that in operation, the downward movement of the hopper occurs whenever the load admitted through the open gate H over balances the weight in the box G, and upon the opening of the gate I this load is suddenly relieved, permitting the counter-weight to again lift the hopper. It is obvious that the inertia of the unbalanced downwardly moving counter-weight is very great in scales of large capacity and that the resulting impact is sufficient to damage the scale. This difficulty I have overcome by the arrangement of shock absorbers which retard the upward movement of the hopper and are then disengaged to free the hopper and beam for attaining a correct balance.

As shown, M are dash-pot members which are pivotally mounted upon brackets M' secured to the frame members A.

$a$ is a plunger engaging the cylinder of each dash-pot and provided with a plunger rod $M^2$ projecting downward into the path of a portion of the main lever D preferably a roll $M^3$ at the inner end of the lever.

The dash-pots M on opposite ends of the hopper are connected to each other to work in unison through the medium of a cross rock shaft $M^4$ and one of the dash-pots has attached thereto the oppositely extending arms $M^5$ and $M^6$. The former has mounted thereon the weight $M^7$, and at its free end is connected with a vertically extending rod $M^8$ slidably engaging a bearing $M^9$ on the stationary frame.

N is a lever pivoted to a member N' secured to the hopper F and having one arm extending into the path of the vertically movable rod $M^8$, while the opposite end of said lever engages a bell crank arm $J^4$ of the crank arm $J^2$, the arrangement being such that the actuation of the lever N by the rod $M^8$ will cause the rocking of the bell crank $J^4$ and throw the rock shaft J' and crank arms $J^2$ over dead center and into a position where the links J may be drawn downward by the weight with the grain on the gate I. The opposite arm $M^6$ which is attached to the dash-pot M extends beneath a bell crank arm $J^5$ connected to the opposite crank $J^2$, being so positioned that whenever the gate I closes the bell crank arm $J^5$ will depress the arm $M^6$, tilting the dash-pots and disengaging the plungers $M^2$ thereof from the rolls $M^3$ so as to free the main lever. When the dash-pots are thus tilted the arm $M^5$ is raised to a position where it will engage a latch O which will temporarily hold the connected parts from movement, this latch being released upon the complete closing of the upper gate H.

It will be understood from the construction of mechanism just described that a double function is performed. First the shock of the upward movement of the hopper is absorbed by the dash-pots, and second the inlet and discharge gates are alternately locked and unlocked. The shock absorption is further taken care of by a second pair of dash-pots P which are arranged to engage with the outer end of the main lever after the disengagement of the dash-pots M and to retard the further movement of the parts until the lugs G' of the weight box rest upon the extensions A' of the frame. These dash-pots P are so arranged as to clear the lever D when in position of balance, while at that time the dash-pots M are also disengaged, thereby avoiding any interference with the accuracy in the weighing of the scale.

With automatic weighing scales where the closing of the inlet gate is effected by the movement of the hopper upon attaining balance, there is always a certain amount of grain which is in the air during the closing operation and which constitutes an overweight. The amount of this overweight is diminished by closing the inlet gate to a dribble opening before complete balance is reached but there is always, and unavoidably, an overweight. To compensate for this the weighing lever is provided with a plus and minus beam having a shiftable poise and which permits of first weighing the overweight on the plus beam and then setting the poise to a corresponding position on the minus beam. As a further check upon the accuracy of the scale I have provided means for recording the setting of the poise, the construction being as follows: Q is the plus and minus beam attached at its opposite ends to the main lever D and arranged outside of the end frame A. Q' is the poise which has a slot or opening $Q^2$ therein through which a ticket may be inserted beneath the lower edge of the beam. $Q^3$ are type characters on the lower edge of the beam and which may be impressed upon the ticket by the operation of a plunger $Q^4$ actuated by a lever $Q^5$. Thus the weigh-master can impress upon a ticket a recording of the setting of the poise during any operation of the scale.

It is desirable to prevent opening of the inlet gate of the scale whenever there is an insufficient quantity of grain in the garner to fill the scale hopper. This I accomplish by arranging within the garner R a movable plate R' pivotally mounted at $R^2$ adjacent to one of the side walls. This plate is connected by a lever arm $R^3$ with a cable $R^4$ which passes over suitable sheaves and is connected by a rock arm $R^5$ with a rock shaft $R^6$ mounted in bearings at the upper end of the frame. Secured to this rock shaft $R^6$ are rock arms $R^7$ adapted to engage with the gate H when in closed position and to lock the same from opening. The arrangement is such that when the garner is empty or the grain therein is below the plate R, the parts will assume the position where the arms $R^7$ lock the gate H from opening. When, however, the grain in the garner assumes a higher level a lateral pressure against the plate R will rock the same on its pivot, thereby drawing upon the cable $R^4$ and rocking the shaft $R^6$ to disengage the arms $R^7$ from the gate and permitting the opening of the latter.

The scale is preferably provided with a residue weigher by which any quantity of grain less than the full load for which the scale is set, may be accurately weighed. This consists in a system of levers arranged above the weight box and adapted to be connected therewith through the medium of a detachable clevis. To facilitate such attachment and detachment of this residue weigher a pneumatic or steam motor is preferably arranged beneath the weight box in such a position that when operated it will lift the box and permit of attaching the clevis. In detail, S is a cylinder mounted upon a supporting beam beneath the weight box and S' is the piston thereof which when actuated upward will lift the box. T is the clevis centrally attached to the weight box and adapted to be coupled to a hook on the steelyard rod T' of the lever stem. U is the graduated beam of this stem on which an adjustable poise U' is mounted and $U^2$ is a second poise engaging another portion of the beam and which may be adjusted to first place the lever stem in balance. The beam U is reversely graduated so as to give a reading of the exact weight of grain in the hopper instead of the differential or underweight from that at which the scale is set. Thus where the last draft of grain from the garner is less than the full load, by manipulating the residue weigher as just described the weight of this grain can be accurately determined.

What I claim as my invention is:

1. In a scale, the combination with balance mechanism, a load receiving hopper, a counter-balancing weight, inlet and discharge gates for said hopper controlled by the movement thereof to alternately load and unload the scale, shock absorbing means operative to absorb the inertia of movement of said mechanism when relieved of load, and means for freeing said mechanism from said shock absorbing means when the scale is finding its balance.

2. In a scale, the combination with balance mechanism, a hopper and a counterbalancing weight, of inlet and discharge gates for said hopper controlled by the movement of said mechanism to alternately load and unload the hopper, shock absorbing means operatively engaging said mechanism when the hopper is relieved of load to absorb the inertia of movement thereof, means for disengaging said shock absorbing means, and a second shock absorbing means operative after the mechanism has passed the point of balance to absorb the inertia of the final movement.

3. In a scale, the combination with balance mechanism, a hopper and a counterbalancing weight, of inlet and discharge gates controlled by the movement of said mechanism to alternately load and unload the hopper, a dash-pot automatically engaging said mechanism when the scale is under load and operative to absorb the inertia of movement when relieved of load, and means for disengaging said dashpot before a succeeding loading operation.

4. In a scale, the combination with balancing mechanism, a hopper and a counterbalancing weight, of inlet and discharge gates controlled by the movement of said mechanism to alternately load and unload the hopper, a dash-pot automatically engaging said mechanism when under load and operating when the load is relieved, means for disengaging said dash-pot from said mechanism, and a second dash-pot, operating at a point beyond the balancing position to absorb the inertia of final movement.

5. In a scale, the combination with the hopper and a discharge gate hinged thereto, of locking mechanism for said gate comprising a pair of links attached to opposite ends thereof and extending adjacent to said hopper, a rock shaft passing through said hopper, rock arms on said shaft engaging the upper ends of said link and adapted to fold with the latter to hold the gate in closed position, a break weight lever, a trip actuated by one end of said break weight lever to rock said shaft and unlock said links, and a rock arm on said shaft engaging the opposite end of said lever on the closing of said gate to restore said break weight lever to its normal position.

6. In a scale, the combination with a balance mechanism, a hopper, inlet and discharge gates controlled by the movement of said hopper to alternately load and unload the same, automatic locking means for said gates, a break weight lever for alternately unlocking said gates, a shock absorber for absorbing the inertia of movement when said hopper is relieved of load, and a connection between said shock absorber and break weight lever by which the former is adjusted into operative and inoperative position.

7. In a scale, the combination with a balance mechanism, a hopper, inlet and discharge gates for said hopper controlled by the movement of said balance mechanism to alternately load and unload the scale, a dash-pot, a pivotal mounting for said dash-pot on which it may be adjusted into and out of engagement with said hopper, a trip mechanism controlling the opening of said gates, and a lever connected to said pivotal dash-pot and forming a common actuating means for the same and said trip mechanism.

8. In a scale, the combination with the main lever, a hopper supported thereon, and a counter-balancing weight, of a pair of dash-pots upon opposite sides of said lever and upon opposite sides of the fulcrum thereof, means for engaging one of said dash-pots with said lever when said hopper is under load and for maintaining said engagement when relieved of load until said lever has passed the position of balance, and means for disengaging said dash-pot from the lever and for engaging the other dash-pot therewith.

9. In a scale, the combination with the main lever, a hopper supported thereon and a counter-balancing weight, of a dash-pot above said lever engageable and disengageable therewith and operating when the hopper is first relieved of load, and a dash-pot below said lever operating thereon during the return movement of said lever.

10. In a scale, the combination with a lever, of a pivotally mounted dash-pot, a roll on said lever for engaging the plunger of said dash-pot in one position of adjustment, and means for rocking said dash-pot to disengage the same from said roll and lever.

11. In a scale, the combination with a hopper, and inlet and discharge gates for alternately loading and unloading the same, of a garner from which the material is fed to the inlet gate, and means independent of the lever weighing mechanism for automatically locking said inlet gate when said garner contains less than a hopper load.

In testimony whereof I affix my signature in presence of two witnesses.

JOHN H. A. BOUSFIELD.

Witnesses:
OSCAR E. BECK,
HAROLD O. FRENCH.

Copies of this patent may be obtained for five cents each, by addressing the "Commissioner of Patents, Washington, D. C."